Sept. 19, 1967  T. E. KIRK ET AL  3,343,059
SEMICONDUCTOR GENERATOR VOLTAGE REGULATOR SYSTEM
Filed Jan. 4, 1965
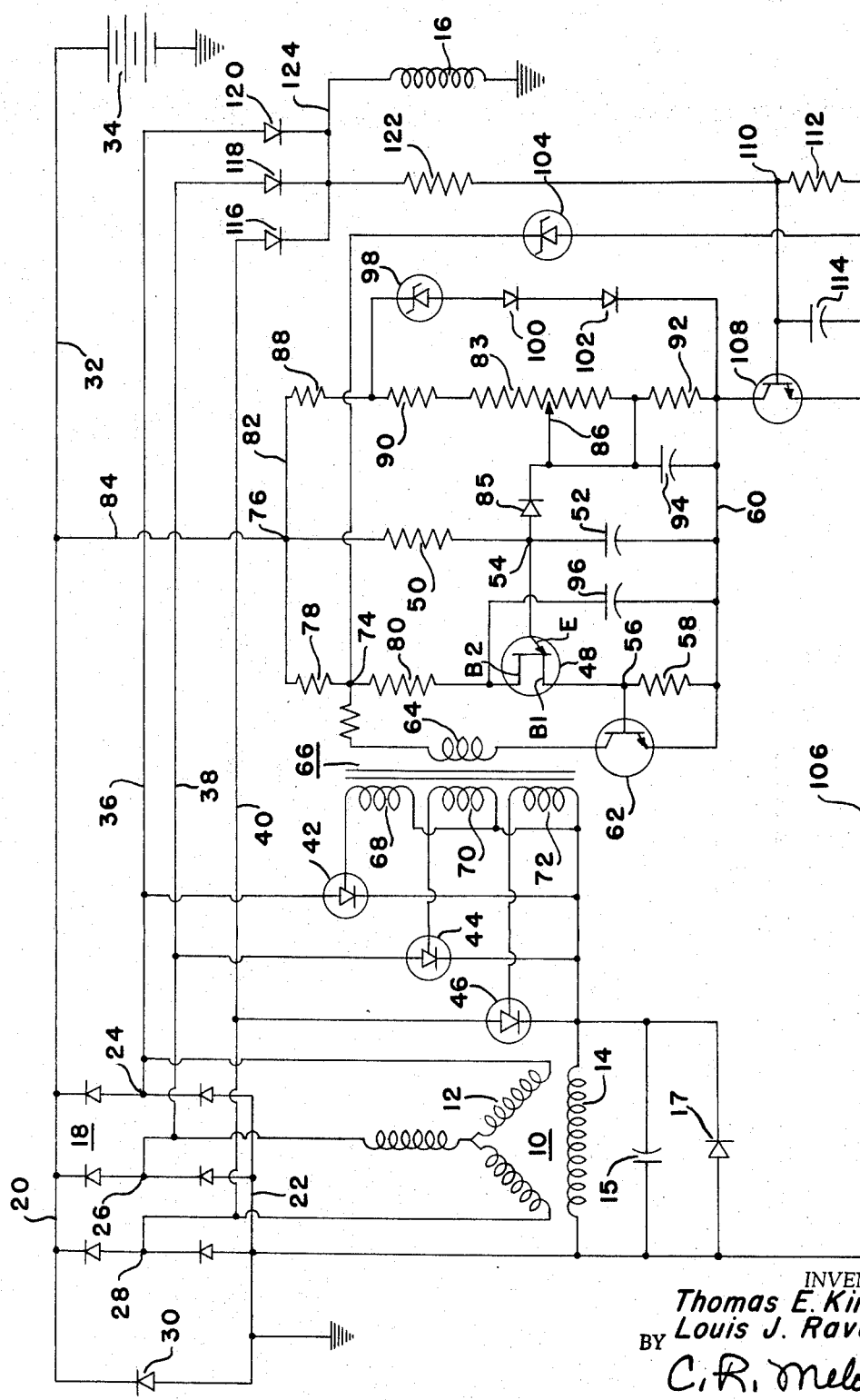
INVENTORS
Thomas E. Kirk
BY Louis J. Raver
C. R. Meland
Their Attorney

# United States Patent Office 3,343,059
Patented Sept. 19, 1967

3,343,059
SEMICONDUCTOR GENERATOR VOLTAGE
REGULATOR SYSTEM
Thomas E. Kirk and Louis J. Raver, Anderson, Ind., assignors to General Motors Corporation, Detroit, Mich., a corporation of Delaware
Filed Jan. 4, 1965, Ser. No. 423,179
5 Claims. (Cl. 320—39)

ABSTRACT OF THE DISCLOSURE

A voltage regulator system is provided for an alternating current generator which supplies a direct current output circuit. The voltage regulator includes a voltage divider for sensing the output voltage appearing across the direct current output circuit. The voltage divider is connected across the output circuit through a transistor which only becomes conductive when the generator begins to develop an output voltage. The voltage divider controls an oscillator circuit which in turn controls a plurality of control rectifiers connected between the output winding of the generator and the field of the generator.

---

This invention relates to a generator regulator system and more particularly to a regulator system which is completely static and which has means for energizing the regulator in response to the generation of the voltage by the generator due to residual magnetism.

It is known in the voltage regulator art to provide systems wherein a transistor or other semiconductor controls the field current of a generator in response to the output voltage of the generator.

One of the problems encountered in this type of system is initially energizing the field winding of the generator in order to provide sufficient current to the field so that the generator will build up in voltage. This has been accomplished in the past by using a switch which connects the batteries of a motor vehicle electrical system with the field for initially energizing the field and in some cases, a field relay is used.

In another type of system which is shown in a patent to Raver, et al., 3,129,378, a transistor is used to connect one side of the regulator circuit with one side of the direct current circuit and the transistor is controlled by a manually operable switch. In this arrangement, the closure of the switch biases the transistor or transistors to a conductive condition which permits the regulator to conduct current to provide an initial energization of the field.

Typical systems which use field relays are shown in the patents to Larson, et al., 3,022,456, and to Hetzler, et al., 2,992,383.

In contrast to the above-described relay systems or the transistor system of Patent 3,129,378 which is controlled by a manually operable switch, it is an object of this invention to provide an electrical system wherein the output voltage developed by a generator due to residual magnetism is used to trigger a circuit which then connects the regulator of the system across the direct current output circuit of the system to therefore provide for an initial energization of the field winding of the generator and to further provide a means whereby the regulator is disconnected from the system when the generator is not producing an output voltage.

Another object of this invention is to provide a generator regulator system wherein the regulator is connected to one side of the direct current output circuit through a semiconductor such as a transistor which has its conduction controlled by the output voltage of the generator. In carrying this object forward, the system is designed such that the voltage developed in the generator due to residual magnetism is sufficient to trigger the semiconductor into conduction to thereby connect the regulator system across the DC output terminals of the generating system.

Still another object of this invention is to provide a controlled rectifier voltage regulating system for a generator wherein a means is provided for connecting the controlled rectifier voltage regulator across the output terminals of the direct current source when a generator is developing a voltage due to residual magnetism.

A further object of this invention is to provide a controlled rectifier voltage regulator system which includes a unijunction transistor oscillator and to provide a static system for energizing the oscillator in response to the development of a voltage in a generator due to residual magnetism.

Further objects and advantages of the present invention will be apparent from the following description, reference being had to the accompanying drawings wherein preferred embodiments of the present invention are clearly shown.

In the drawing:

The single figure drawing is a schematic circuit diagram of an electrical system made in accordance with this invention.

Referring now to the drawing, the reference numeral 10 generally designates an alternating current generator which has a three phase Y-connected output winding 12, a main field winding 14, and a reverse field winding 16. The effect of the magnetic flux developed by the reverse field winding 16 opposes the effect of the main field winding 14.

The output voltage of the three phase winding 12 is rectified by a three phase full-wave bridge rectifier generally designated by reference numeral 18. This bridge rectifier is comprised of six silicon diodes and it is seen that the bridge rectifier has a positive output terminal 20 and a negative grounded output terminal 22. The phase windings of the output winding 12 are connected with the AC input terminals 24, 26 and 28 of the bridge rectifier 18. A silicon diode 30 which is used as a protective device is connected across the DC output terminals of the bridge rectifier 18.

The DC output terminal 20 is connected with a positive power conductor 32 and the various direct current loads on a motor vehicle are energized by connecting them between conductor 32 and ground. One of these loads is illustrated as a battery 34.

The output winding 12 feeds conductors 36, 38 and 40. These conductors are connected with controlled rectifiers 42, 44 and 46 which are operative to feed the main field winding 14 when the controlled rectifiers are conductive. It is seen that when the controlled rectifiers are conductive, these controlled rectifiers together with the three lower diodes of the bridge rectifier 18 form a full wave circuit for supplying direct current to the main field winding 14.

The conduction of the controlled rectifiers 42, 44 and 46 is controlled by a voltage sensitive oscillator circuit which senses the output voltage of the bridge rectifier 18. This oscillator circuit includes a unijunction transistor 48, a resistor 50, and a capacitor 52. The unijunction transistor 48 has an emitter E, a base $B_1$ and a second base $B_2$. The emitter of transistor 48 is connected with junction 54 while the base $B_1$ is connected with junction 56. A resistor 58 connects the junction 56 to a conductor 60.

The resistor 58 is connected across the base and emitter electrodes of a transistor 62. The collector of transistor 62 is conneced with the primary winding 64 of the transformer 66. The transformer 66 has secondary windings 68, 70 and 72 which are connected with the gates of controlled rectifiers 42, 44 and 46 and when voltages are induced in these secondary windings which drive the gates positive, the controlled rectifiers are biased to a conductive condition.

The primary winding 64 is connected to a junction 74. This junction is connected with junction 76 via resistor 78 and is connected with base $B_2$ of transistor 48 through resistor 80. The junction 76 is connected with conductor 82 and is also connected with the positive DC power line 32 through a conductor 84.

A variable resistor 83 is provided which has a shiftable tap 86. The variable resistor 83 is connected in series with resistors 88 and 90 at one end thereof and is connected in series with resistor 92 which goes to the conductor 60. A capacitor 94 is connected across the resistor 92 and another capacitor 96 is connected between conductor 60 and the base $B_2$ of unijunction transistor 48.

The resistors 90, 83 and 92 are shunted by a circuit which includes a Zener diode 98 and two silicon diodes 100 and 102. A Zener diode 104 is connected between junction 74 and a grounded power supply conductor 106.

An NPN transistor 108 is provided which has a collector connected with conductor 60 and an emitter connected with the grounded power supply conductor 106. The base of transistor 108 is connected with junction 110. A resistor 112 connects the junction 110 with conductor 106 and a capacitor 114 is connected across the base and emitter circuit of transistor 108.

The electrical system includes silicon diodes 116, 118 and 120 which are connected with the phase windings of the output winding 12 via conductors 36, 38 and 40. These diodes together with the lower diodes of the bridge rectifier 18 comprise a three phase full-wave bridge network which is capable of supplying direct current to the circuit that includes resistor 112 and resistor 122. This circuit can also supply direct current to the field winding 16 via conductor 124 where a reverse field is desired. If the system is used with a generator that has only a main field, the diodes 116, 118 and 120 are only used to supply current to the resistor 112.

The operation of the electrical system will now be described with reference to the drawing. When the generator of the system is being driven, the generator will develop an output voltage which depends upon the speed it is driven and upon the amount of current supplied to its field windings, all of which is well known to those skilled in the art. The system of this invention depends upon residual magnetism of the generator for initial build-up of voltage. As the generator develops a voltage due to residual magnetism, a direct current will flow through the resistor 112 due to rectification by the circuit that includes the diodes 116, 118 and 120. When sufficient current flows through resistor 112, it develops a voltage drop which drives the base of transistor 108 positive with respect to its emitter. This will turn the transistor 108 on in its emitter-collector circuit and when this happens, the transistor 108 in effect directly connects the conductor 60 with the negative power line 106. When this connection is made, the regulator circuit can be energized since conductor 82 and junction 76 are connected with the positive power line 32 via conductor 84.

Assuming now that transistor 108 has been turned on, the capacitor 52 will be charged from conductor 32 via a circuit that includes conductor 32, conductor 84, junction 76, resistor 50, capacitor 52, conductor 60, and then through the collector to emitter circuit of transistor 108 to the negative grounded power line 106. This initial current will be supplied by the battery 34 where the output voltage of the bridge rectifier is below battery voltage as when the generator has not built up to its full output voltage.

The potential of junction 54, is maintained substantially constant due to the clamping diode 85 and the Zener diode 98 which maintains the voltage across the resistors 90, 83 and 92 substantially constant. The voltage appearing between the base electrodes $B_2$ and $B_1$ of the unijunction transistor 48, however, changes in accordance with changes in output voltage of the bridge rectifier 18 and when this voltage is below a predetermined value, the transistor 48 will conduct between its emitter electrode E and its base $B_1$. When this happens, the capacitor 52 can discharge through the unijunction transistor 48 and through resistor 58. When the capacitor discharges through resistor 58, the transistor 62 will be biased to a conductive condition and current can then flow through primary winding 64 for a period of time corresponding to the conductive condition of transistor 62. When current flows through primary winding 64, turn-on voltages are induced in secondary windings 68, 70 and 72 to bias the controlled rectifiers 42, 44 and 46 to a conductive condition. When the controlled rectifiers turn on, field current will be supplied to the field winding 14 and the generator voltage will then begin to increase. The capacitor 52 will continue to charge and discharge at a rate which may be, for example, five kilocycles as long as the output voltage of the bridge rectifier 18 is below a desired regulated value and controlled rectifiers 42, 44 and 46 will therefore be supplied with turn-on signals as long as the output voltage is below the regulated output value.

Once the output voltage goes above the desired regulated output value, the voltage appearing between base $B_2$ and base $B_1$ of the unijunction transistor 48 will rise to a point where it will no longer be conductive between emitter E and base $B_1$. As a result, the oscillator will cease oscillations and no turn-on signals will be supplied to the controlled rectifiers 42, 44 and 46. When this occurs, current to the field 14 is cut-off resulting in a drop in the output voltage of phase windings 12 and a corresponding drop in the output voltage of bridge rectifier 18.

It will be appreciated that the transistor 108 is the element in the circuit which determines whether or not the oscillator will be energized. Thus when transistor 108 is nonconductive, there can be no current flow between conductor 60 and the grounded power line 106 so that in effect, the voltage sensitive oscillator circuit is not energized. This is the case when the generator is not operating and in such a situation, the battery 34 has no discharge path since it cannot discharge through the bridge rectifier 18 and cannot discharge through the oscillator circuit because the transistor 108 is nonconductive.

The transistor 108 begins to conduct when the generator develops a voltage due to residual magnetism and builds up to full output voltage once the transistor 108 is biased to a conductive condition.

It will be appreciated from the foregoing that a completely static system has been provided which requires no manually operable switches and no field relays controlled by manually operable switches. The system is ready for use by simply connecting the DC loads between conductor 32 and ground and is operative with no battery connected.

The Zener diode 104 is a transient protection device and does not conduct under normal voltages that appear between the power lines 32 and 106. The capacitor 15 serves to assist in getting the field turned on by preventing collapse of field current during initial build-up of the generator. The diode 17 is a field discharge diode. The diodes 100 and 102 are temperature compensating diodes.

Where a system is used that does not have a reverse field 16, it is desirable to connect a 50 ohm resistor across the main field 14.

The system as described is for use with a twelve volt system and where a twenty-four volt system is used, it is desirable to connect a 330 ohm resistor in line 84.

Although the system as described uses a transistor 108 for connecting one side of a controlled rectifier regulator to one of the DC power lines, it will be appreciated that this transistor could be used with other types of voltage regulators, for example, a transistor regulator and still provide a completely static system wherein the regulator is initially energized through a transistor 108 and due to a voltage build up of the generator from residual magnetism.

While the embodiments of the present invention as herein disclosed constitute a preferred form, it is to be understood that other forms might be adopted.

What is claimed is as follows:

1. An electrical system comprising, an alternating current generator having a field winding and a three phase output winding, a three phase full-wave bridge rectifier connected with said output winding having direct current output terminals connected with a direct current load circuit, a battery connected directly across said load circuit one end of which is connected at all times with one of the DC output terminals of said bridge rectifier network when said system is being used, a plurality of controlled rectifiers connected with said three phase output winding and with said field winding for supplying direct current to said field winding when said controlled rectifiers are conductive, a static oscillator circuit, a transformer having a primary winding and a plurality of secondary windings, said oscillator circuit including said primary winding, said secondary windings being connected with the gate and cathode electrodes of said controlled rectifiers, means connecting one side of said oscillator circuit with one side of said direct current output circuit, means connecting an opposite side of said oscillator circuit with an opposite side of said direct current output circuit including a semiconductor switch, and a plurality of diodes connected with said output winding and with said semiconductor switch for supplying a turn-on voltage to said semiconductor switch when said generator begins to build up, said battery providing an initial energization for said oscillator circuit when said generator begins to build up and when said semiconductor switch is turned on.

2. The electrical system according to claim 1 where the semiconductor switch is a transistor and wherein a resistor that is connected with said diodes is connected across the emitter and base electrodes of the transistor.

3. The electrical system according to claim 1 where the generator has a second field winding and wherein the second field winding is energized from said diodes.

4. An electrical system comprising, an alternating current generator having an output winding and a field winding, a rectifier means connected with said output winding having direct current output terminals connected with a direct current output circuit, a battery connected across said direct current output circuit to be charged by said rectifier means, said rectifier means preventing said battery from discharging through said output winding, a voltage regulating means including a voltage sensing circuit and including field current control means connected with said field winding of said generator for regulating the current flow in said field winding as a function of the output voltage of said generator, a circuit connecting said voltage sensing means of said voltage regulating means across said direct current output circuit, said circuit including an electronic switch means separate from said voltage regulating means connected in series between one end of said voltage sensing means and one side of said direct current output circuit, said electronic switch means when in a nonconductive condition preventing current flow through said voltage sensing circuit of said voltage regulating means whereby said battery is prevented from discharging through said voltage regulating means when said electronic switch means is nonconductive, and means connected with said output winding of said generator for applying a bias voltage to said electronic switch means to bias said electronic switch means conductive when said generator begins to develop an output voltage, said voltage sensing means controlling said field current control means whereby field current is applied to said field winding when said electronic switch means is biased conductive to energize said voltage sensing means from said direct current output circuit.

5. An electric generating system comprising, a polyphase alternating current generator having a polyphase output winding and a field winding, a rectifier means having AC input terminals connected with said polyphase output winding and having direct current output terminals connected with a direct current output circuit, a battery connected across said direct current output circuit, said rectifier means being operative to prevent said battery from discharging through said output winding, a voltage regulating means including a voltage sensing means and a field current controlling means, said field current controlling means being connected with said field winding and being operative to vary the field current of said generator as a function of the voltage sensed by said voltage sensing means, a circuit connecting said voltage sensing means across said direct current output circuit including an electronic switch means separate from regulating means connected in series in said circuit, said electronic switch means having a control electrode, a plurality of auxiliary diodes connected between the AC input terminals of said rectifier means and said control electrode of said electronic switch means, said auxiliary diodes applying a potential to said control electrode of said electronic switch means to bias said electronic switch means conductive when said generator initially develops an output voltage, said battery discharging through said voltage sensing means and said electronic switch means to initially energize said field current control means when said generator initially develops an output voltage, said electronic switch means being operative to prevent said battery from discharging through said voltage sensing means when said generator is not developing an output voltage.

References Cited

UNITED STATES PATENTS

| | | | |
|---|---|---|---|
| 3,009,091 | 11/1961 | Hallidy | 322—28 |
| 3,154,733 | 10/1964 | Pratt | 322—73 X |
| 3,160,805 | 12/1964 | Lawson | 320—39 |
| 3,226,559 | 12/1965 | Klein | 322—73 X |

JOHN F. COUCH, *Primary Examiner.*

S. WEINBERG, *Assistant Examiner.*